United States Patent [19]

Kuless

[11] Patent Number: 4,640,114
[45] Date of Patent: Feb. 3, 1987

[54] AUTOMATED PROCESS FOR COLD WORKING HOLES

[75] Inventor: Madeline A. Kuless, Bethpage, N.Y.

[73] Assignee: Grumman Aerospace Corporation, Bethpage, N.Y.

[21] Appl. No.: 696,230

[22] Filed: Jan. 29, 1985

[51] Int. Cl.⁴ .............................................. B21D 41/02
[52] U.S. Cl. ........................................ 72/22; 72/342; 72/370
[58] Field of Search ............ 72/370, 342, 391, 453.17, 72/453.19, 22, 23; 227/69, 73, 74; 29/815, 26 A, 447; 425/508, 517; 285/381; 148/402

[56] References Cited

U.S. PATENT DOCUMENTS

| | | |
|---|---|---|
| 405,929 | 6/1889 | Unbehend . |
| 418,341 | 12/1889 | Preston . |
| 1,240,207 | 9/1917 | Hinchcliff . |
| 1,737,010 | 11/1929 | Hanna ............................. 72/453.19 |
| 1,901,375 | 3/1933 | Peterson . |
| 1,976,776 | 10/1934 | Gookin . |
| 2,185,483 | 1/1940 | Ward . |
| 2,193,084 | 3/1940 | Aeschbach et al. ................. 227/69 |
| 2,361,668 | 10/1944 | Wales . |
| 2,373,436 | 4/1945 | Treciokas . |
| 2,843,174 | 7/1958 | Jones ................................ 72/453.17 |
| 3,092,714 | 6/1963 | Hinden ............................... 219/101 |
| 3,151,330 | 10/1964 | Scuccimarri . |
| 3,456,483 | 7/1969 | Crothers et al. ...................... 72/478 |
| 3,566,662 | 3/1971 | Champoux ........................... 72/370 |
| 3,640,655 | 2/1972 | Wallace ................................ 29/815 |
| 3,756,051 | 9/1973 | Rebsamen ............................. 72/23 |
| 3,805,567 | 4/1974 | Agius-Sinerco ..................... 29/447 |
| 3,812,568 | 5/1974 | Nemeth et al. ...................... 29/447 |
| 3,816,895 | 6/1974 | Kuehn et al. ...................... 29/200 P |
| 3,849,864 | 11/1974 | Plummer ............................. 29/447 |
| 3,926,356 | 12/1975 | Still .................................. 227/114 |
| 4,180,195 | 12/1979 | Caley et al. ......................... 227/69 |
| 4,433,567 | 2/1984 | Mead ................................. 72/342 |
| 4,528,733 | 7/1985 | Lord .................................. 29/447 |

FOREIGN PATENT DOCUMENTS 47704 4/1977 Japan ................................. 285/381

Primary Examiner—Lowell A. Larson
Attorney, Agent, or Firm—Pollock, VandeSande & Priddy

[57] ABSTRACT

A method for cold working holes employs an automatic riveting machine that is fed with memory metal sleeves having an O.D. slightly smaller than a hole to be worked. A mandrel is forced into the sleeve and plastically expands the sleeve in the hole thereby working the hole wall around the sleeve. The mandrel is withdrawn and the sleeve is thermally induced to return to its initial shape memory O.D. permitting removal of the shrunken sleeve from the work hole.

1 Claim, 5 Drawing Figures

AUTOMATED PROCESS FOR COLD WORKING HOLES

BACKGROUND OF THE INVENTION

This invention relates to automated working of metals and, more particularly, to a method for the working or final sizing of holes, for example, holes in aluminum, steel, magnesium, and alloys used in the structure of aircraft and aerospace vehicles.

It has long been the practice, in the fabrication and assembly of structures, such, for example, of aircraft and aerospace structures, to first drill or punch holes through the metal through which bolts, rivets, or fasteners are to pass and to then work the metal around the hole. Such working stretches the workpiece beyond the yield strength of the workpiece and increases the fatigue life of the structure about the hole by greatly reducing flaws or stress concentration points and by generating compressive stress gradients within the material about the worked hole. Because the greatest tensile stress concentration from external loading occurs at the hole surface, increased residual compression stress gradients increases the fatigue life of the structure.

Prior to the invention disclosed in U.S. Pat. No. 4,433,567 which issued to the present assignee, one method followed in working of drilled or punched holes has been to force a ball having a diameter slightly larger than the hole through the hole, enlarging the hole and compressing the metal around the hole. Rather than using a ball, slotted collars or split sleeves and oversized mandrels have also been employed. In this arrangement, the slotted collar or split sleeve, having a relaxed diameter which will fit through the drilled hole, is placed in the hole, expanded with a slightly oversized mandrel and the mandrel is removed. The slotted collar or split sleeve springs back to its relaxed diameter, is removed from the hole and discarded.

In the instance of the oversized ball and the slotted collar or split sleeve and the oversized mandrel, in addition to compressing, stressing and increasing the strength and fatigue resistance around the hole, the oversized ball and collar or sleeve, where such collar or sleeve is used, distort or displace the metal. The oversized ball tends to force the metal through as well as radially outwardly of the hole. Thus, the ends of the hole wall are not square and must be subsequently machined or finished. In the case of the slotted collar or split sleeve, a ridge in the hole wall at the collar slot or sleeve split may be formed which must be removed by machining or finishing. Machining or finishing to square the hole wall or remove the ridge in the wall adds to the cost and, to a degree, reduces the advantages attained by working. The likelihood of fatigue related failures is increased.

With the invention of the mentioned patent, it has been discovered that working of holes can be substantially improved and the need for subsequent machining or finishing eliminated resulting in the cost being substantially reduced. It has been discovered that, by employing a full sleeve of a shape memory material, preformed and pretreated in a particular manner and by inserting such sleeve in the hole to be worked, the sleeve can be plastically expanded with a mandrel such that the metal around the hole is worked and compression stressed and the sleeve can be brought thermally to a critical temperature where it shrinks and can be reused. Machining or finishing of the resulting worked hole is not necessary and the collar or sleeve may be plastically expanded and reused again and again by plastically expanding and thermally treating it to cause the sleeve to shrink to its memory shape.

In the prior invention the full sleeve to be used in working is fabricated from a metal treated to have a memory shape, such as Nitinol nickel-titanium alloys or copper-zinc-aluminum alloys, and the like.

Nitinol is a family of nickel-titanium alloys having a chemical composition of from about 53% to 57% by weight of nickel and the balance titanium with small percentages of other elements added to adjust transformation temperature, e.g., iron or cobalt. It was developed by the U.S. Naval Ordnance Laboratory. Copper-zinc-aluminum alloys having about 70% by weight of copper and the balance zinc with small additions of aluminum have also been developed.

The prior invention instituted use of a sleeve of a shape memory alloy, having a transition temperature range between $-320°$ F. and $+300°$ F. which is given a memory shape. It is then cooled below the transition temperature and inserted into the hole and expanded while still below the transition temperature. A mandrel having a diameter larger than the I.D. of the sleeve, which diameter combined with the thickness of the expanded sleeve makes up the diameter of the hole being worked, is inserted into the sleeve while in the hole and is forced through the sleeve. The mandrel passing through the sleeve further enlarges the sleeve and works the hole. The sleeve is then warmed up to above its critical transition temperature and returns to its shrunken memory shape which, of course, is of a smaller O.D. than the I.D. of the worked hole, and is then removed from the worked hole.

After each use, the memory shape sleeve, at its memory shape, can be cooled below its transition temperature, inserted in a hole to be worked, enlarged with a mandrel forced through the memory shape sleeve, warmed above the critical temperature and shrink to its memory shape and the cycle can be repeated for the next hole to be worked.

The memory shape sleeve is continuous. Thus, there is no ridge to be removed nor edge to square. The sleeve is not discarded. Working is simplified and costs are reduced.

BRIEF DESCRIPTION OF THE INVENTION

The present invention relates to the implementation of the method disclosed in the just-discussed patent and is more particularly directed to an implementation of that method on an automatic riveting machine. Rather than relying upon manual mandrel insertion and heating of the material, the present invention relies upon an automatic riveting machine which is fitted with an attachment that holds a mandrel and sleeves as they are sequentially fed to a work point.

A further refinement of the present invention includes a device for thermal inducement, i.e. a tube, mounted on the automatic riveting machine and in proximity to a work point. Thermal inducement is delivered for a preset time interval after the mandrel has forced a sleeve into a drilled hole and has been removed therefrom. A limitation to the use only of heated air should not be implied because radiant heating means, electrical resistance and induction heating, and the like can be employed to induce thermally the change in shape of the memory metal sleeve.

By virtue of the present improvement, the automated process for cold working holes may be expedited and results in lowered costs with attendant increased reliability.

The above-mentioned objects and advantages of the present invention will be more clearly understood when considered in conjunction with the accompanying drawings, in which:

DETAILED DESCRIPTION OF THE INVENTION

Figure 1:
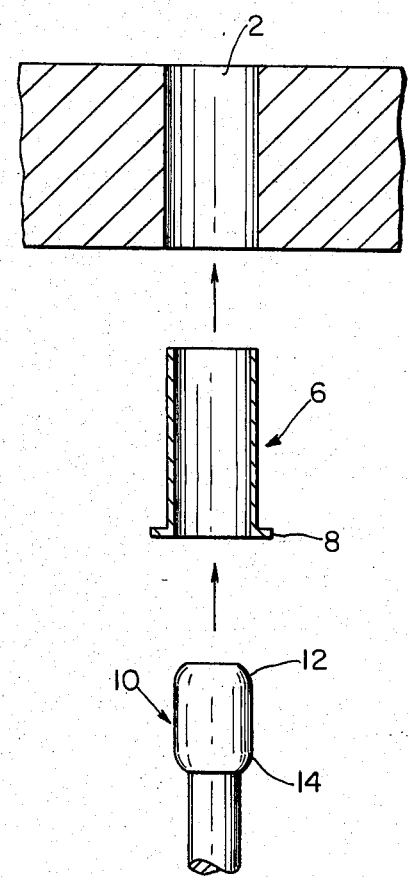
FIG. 1 is a disassembled view of a prior art apparatus for cold working a drilled hole.

In order to appreciate the present invention, reference is made to the basic method set forth in previously mentioned U.S. Pat. No. 4,433,567. Referring to FIG. 1, which shows the patented apparatus, hole 2 in metal member 4, for example, of heat treated aluminum alloy, is drilled and reamed to a hole size typically 0.235 inch.

Sleeve 6 of Nitinol, (or other memory metal alloy) having a shoulder 8 and a wall thickness of about 0.010 inch is memory shaped in conventional manner to an O.D. of 0.234 inch, placed in a liquid nitrogen bath, where it is cooled to the bath temperature. The cooled sleeve 6, having an O.D. of 0.234 inch, an I.D. of 0.214 inch and a wall thickness of 0.010 inch is inserted into hole 2 of member 4 which may be a single plate or a plurality of plates to be bolted, riveted or otherwise fastened together. Cold sleeve 6 is inserted into hole 2 so that shoulder 8 contacts the surface of member 4. Mandrel 10 which may have tapered ends 12, 14 and a median portion of a diameter of 0.234 inch is inserted into sleeve 6 forced through the center of the sleeve to expand the I.D. of the sleeve to 0.234 inch, the diameter of the mandrel, and the O.D. of the sleeve to 0.255 inch. The expansion of sleeve 6 works and enlarges hole 2 from the drilled and reamed diameter of 0.235 inch to a worked diameter of 0.255 inch. Mandrel 10 is withdrawn and sleeve 6 is allowed to return to room temperature and return to its memory shape of 0.234 inch O.D. dimension. Sleeve 6 is then removed from the worked hole and can be recooled in liquid nitrogen, re-inserted into the next hole drilled and reamed to a hole size of 0.235 inch and again expanded with the mandrel to work the metal around such hole. After expanding and working, sleeve 6 is again allowed to return to room or ambient temperature and return to its initial memory shape and dimensions.

The process can be repeated and a number of holes can be worked using the same sleeve and mandrel. Thermal inducement of the sleeve and the returning or shrinking of the sleeve to its original or memory size separates the sleeve from the wall of the worked hole and allows the Nitinol sleeve to be removed without damage to the sleeve or hole wall. Thus, the Nitinol sleeve can be recycled and reused and machining or other finishing of the worked hole is not required.

It is, of course, obvious that the hole to be worked may be of a different size than that described above. When the hole to be worked is of a different size, the size of the Nitinol sleeve and the mandrel with which the sleeve will be expanded are sized proportionately. The original or memory size of the O.D. of the Nitinol sleeve should be slightly less than the size of the drilled hole to be worked and less than the size of the hole after working. This assures that the sleeve might be inserted and, when returned to room temperature, withdrawn without damage to the sleeve or hole wall.

Figure 2:
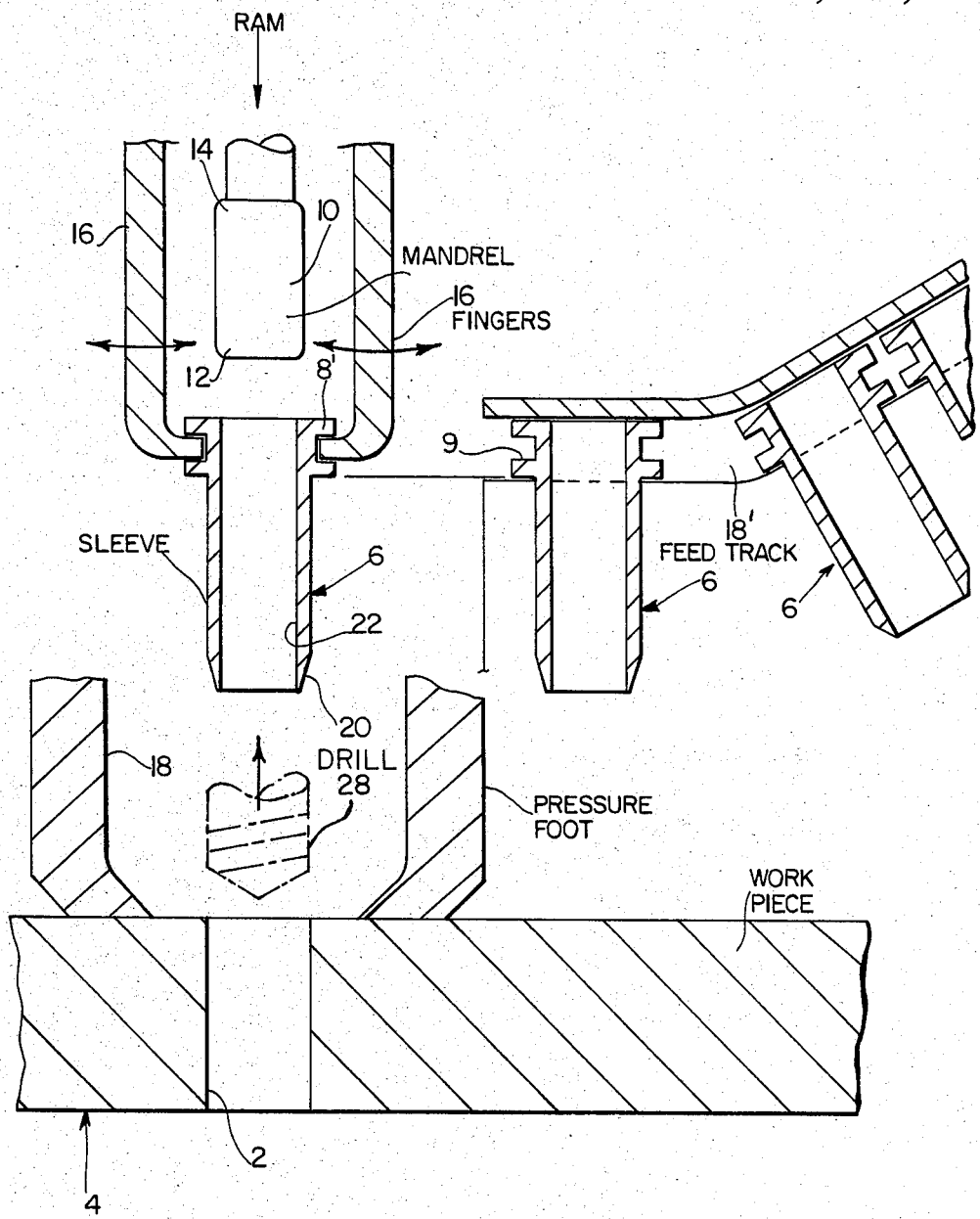
FIG. 2 is a sectional view of the present invention illustrating the utilization of an automatic riveting tool for cold working a drill hole.
Figure 4:
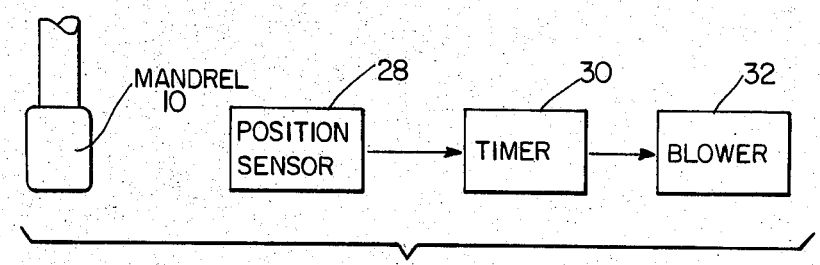
FIG. 4 is a diagrammatic illustration of a position sensing device used in conjunction with the present invention.
Figure 3:
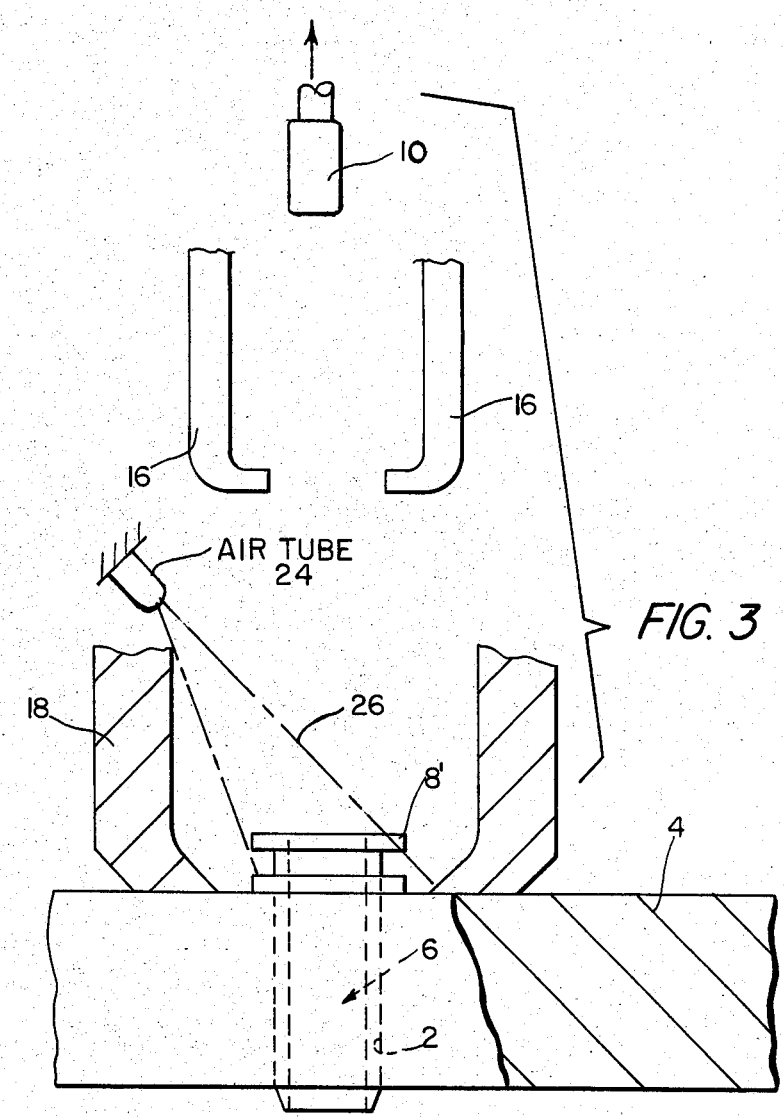
FIG. 3 is a partial sectional view of the apparatus shown in FIG. 2 after insertion of an expandable sleeve.
Figure 5:
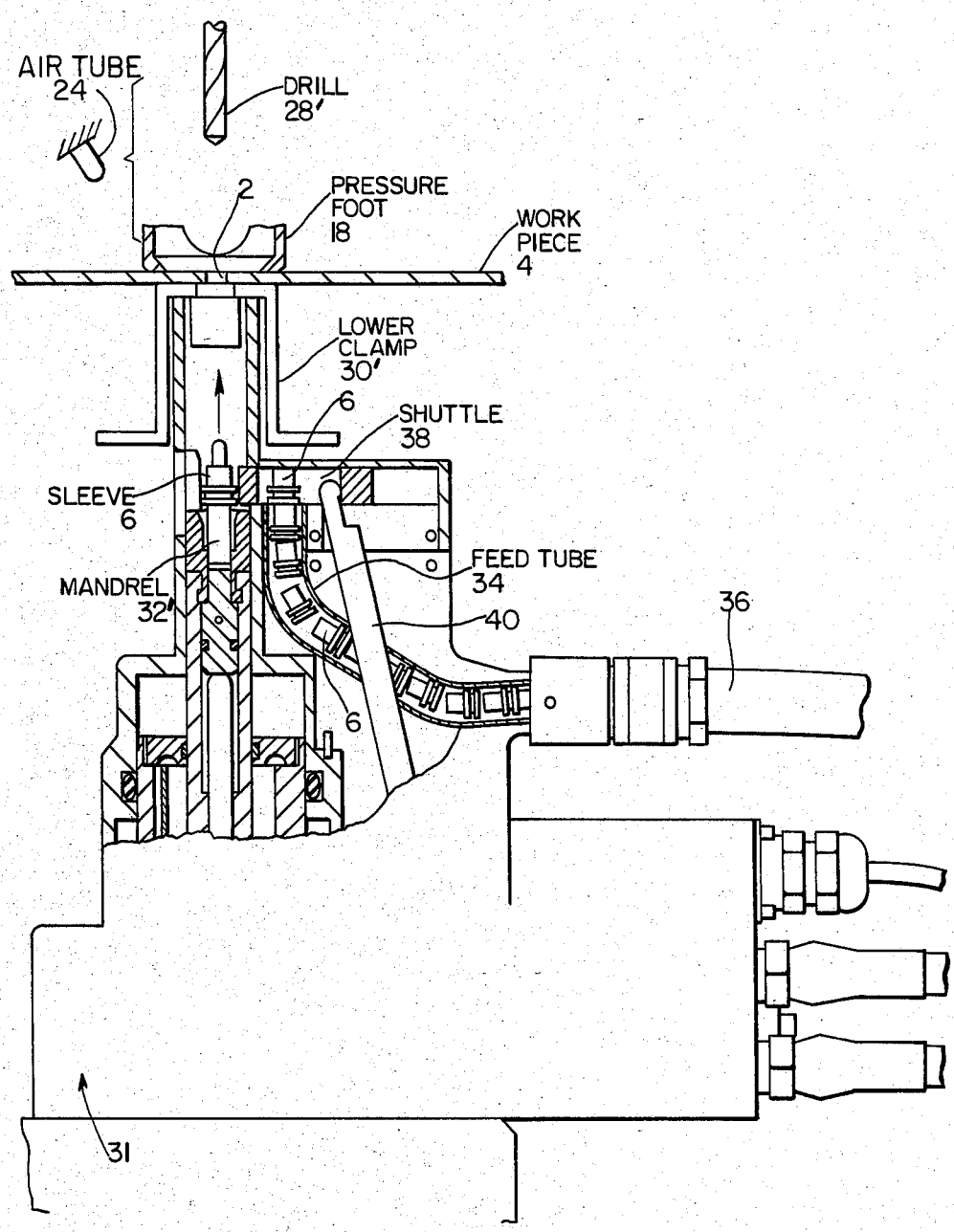
FIG. 5 is a partial sectional view showing the underside of an automatic riveting machine which has been equipped to cold work a drilled hole in accordance with the present invention.

FIGS. 2-4 illustrate a first embodiment of the invention while FIG. 5 is a second embodiment, both implemented by an automatic multi-tool machine, such as the DRIVMATIC automatic riveting machine, which is extensively utilized in the aerospace industry. Reference numerals identical to those in the mentioned patent are employed herein for corresponding structures.

Machines such as the referenced DRIVMATIC are equipped with a chuck (not shown) to which a drill bit 28' may be connected for drilling a hole 2 in a work piece 4 to be cold worked. The pressure foot 18 clamps the work piece in place. After withdrawal of the drill bit, pivotally mounted fingers 16, existing in machines such as the DRIVMATIC, serially feed memory metal alloy sleeves 6. The sleeves may be fabricated from the same metal as discussed hereinabove, but the shoulder portion 8' includes an annular recess 9 for receiving the lower ends of fingers 16 and the end 20 is tapered for easier insertion. Feed track 18' gravitationally delivers the lowermost sleeve 6 to a point where the fingers 16 may grasp the sleeve and lower it into hole 2. The automatic riveting machine equipped with a ram then rams mandrel 10 downwardly through the bore 22 in sleeve 6 thereby plastically deforming it. The mandrel 10 is pulled upwardly to remove it from engagement with sleeve 6. At this point, the hole 2 has been satisfactorily cold worked as was the case with the manual plastic deformation set forth in the prior patent.

FIG. 3 illustrates the next phase of operation. After withdrawal of the mandrel, air tube 24, attached to any convenient stationary surface adjacent sleeve 6 becomes operative. In the event sleeve 6 is of a metal which contracts upon heating, the air delivered through tube 24 along stream 26 is heated air. However, sleeve 6 may be made of a metal material which shrinks when cooled, in which event the tube 24 would deliver cold air. After sufficient exposure to the air delivered from tube 24, sleeve 6 shrinks thereby permitting its removal from the work piece 4.

FIG. 4 illustrates a simplified block diagram of the electrical components for initiation and termination operation of a blower which forces air, of the desired temperature, through tube 24. A conventional position sensor 28 senses the withdrawal cycle of mandrel 10 resulting in the insertion of sleeve 6 into work piece 4 (FIG. 3). Timer 30 initiates operation of blower 32 for a preset time interval during which time stream 26 (FIG. 3) accomplishes shrinking of sleeve 6. After the preset time interval, air is no longer blown over the sleeve 6 and the sleeve may be easily removed and reused.

FIG. 5 shows an alternate embodiment of the present invention wherein the work application occurs on the bottom side of the work piece 4. Drill bit 28' mounted in the chuck of an automatic riveting machine such as the DRIVMATIC is lowered into engagement with work piece 4 and drills the hole to be cold worked, as previously discussed. A lower clamp 30' of the machine engages work piece 4 and clamps it against pressure foot 18 so that the work piece is held securely.

A lower mechanism 31 of an automatic riveting machine, such as the DRIVMATIC, includes a ram mechanism that is capable of displacing mandrel 32' upwardly toward work piece 4. Each sleeve 6 is fed to an upper point of feed tube 34 and shuttle 38, actuated by lever 40, urges each sleeve 6, positioned at shuttle 38, into coaxial alignment with mandrel 32' so that the mandrel may drive sleeve 6 into the hole 2 in work piece 4 and accomplish the plastic expansion discussed in connection with the previous figures. The feed mechanism exists on the DRIVMATIC. In a typical machine of the type discussed, the feed tube 34 is pneumatically pressured via supply lines 36 to serially feed all of the sleeves located therein. Subsequent thermal inducement may be achieved by air tube 24 as previously described.

In summary, the present invention is seen to provide a substantial improvement over the prior art method of cold working holes with metal sleeves. By equipping a multitool machine, with a thermal inducement means such as air tube 24, such as a DRIVMATIC machine, the method of the present invention may be implemented quickly, at lower cost and repeated reliability than the manual method of the mentioned patent.

It should be understood that the invention is not limited to the exact details of construction shown and described herein for obvious modifications will occur to persons skilled in the art.

I claim:

1. An automated method utilizing a multi-tool machine for cold working the wall around a hole in a metal member, the method comprising:
   drilling a plurality of holes in a workpiece;
   serially feeding a plurality of memory metal alloy sleeves to the location of their respective holes from a feed track;
   automatically positioning each sleeve within a respective hole, the outer diameter of each sleeve having a smaller outer diameter than the diameter of the hole;
   driving a mandrel through the sleeve thus causing plastic expansion thereof which cold works the wall of the hole;
   withdrawing the mandrel from the sleeve to complete displacement of the mandrel;
   sensing the displacement of the mandrel;
   initiating a timing cycle upon actuation of the sensing step;
   subjecting the sleeve to a timed heat source located proximate the machine during said timing cycle thus thermally inducing the sleeve for a specific timed period, at a preselected temperature, for shrinking it; and
   removing the sleeve from the hole thus permitting its recycling.

* * * * *